July 16, 1963 J. D. WELLS 3,097,731
POWER TRANSMITTING CLUTCH WITH ANTI-INERTIA BRAKING MEANS
Filed March 28, 1960 2 Sheets-Sheet 1
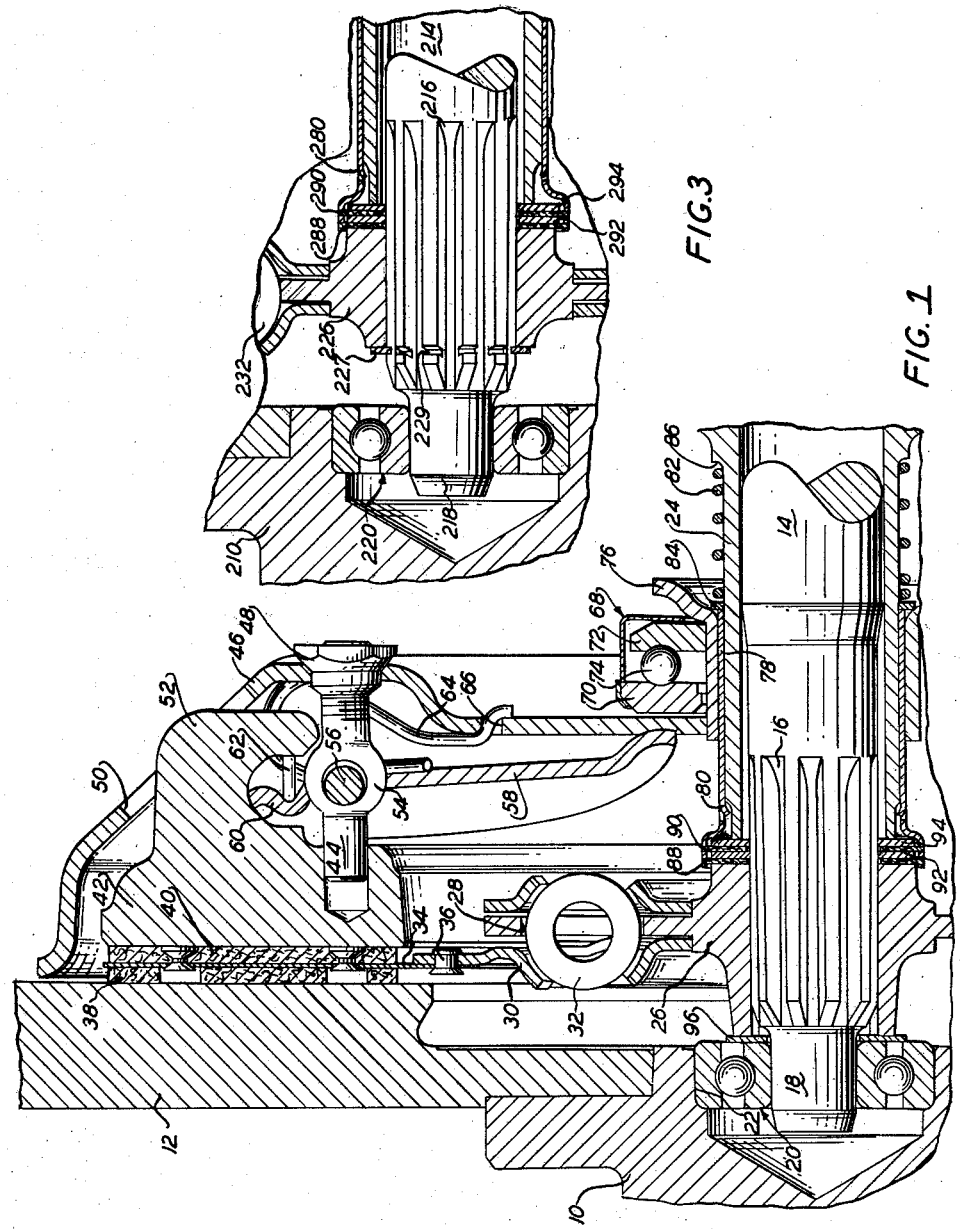
JOHN D. WELLS
*INVENTOR.*
BY John R. Faulkner
Donald J. Harrington
*ATTORNEYS*

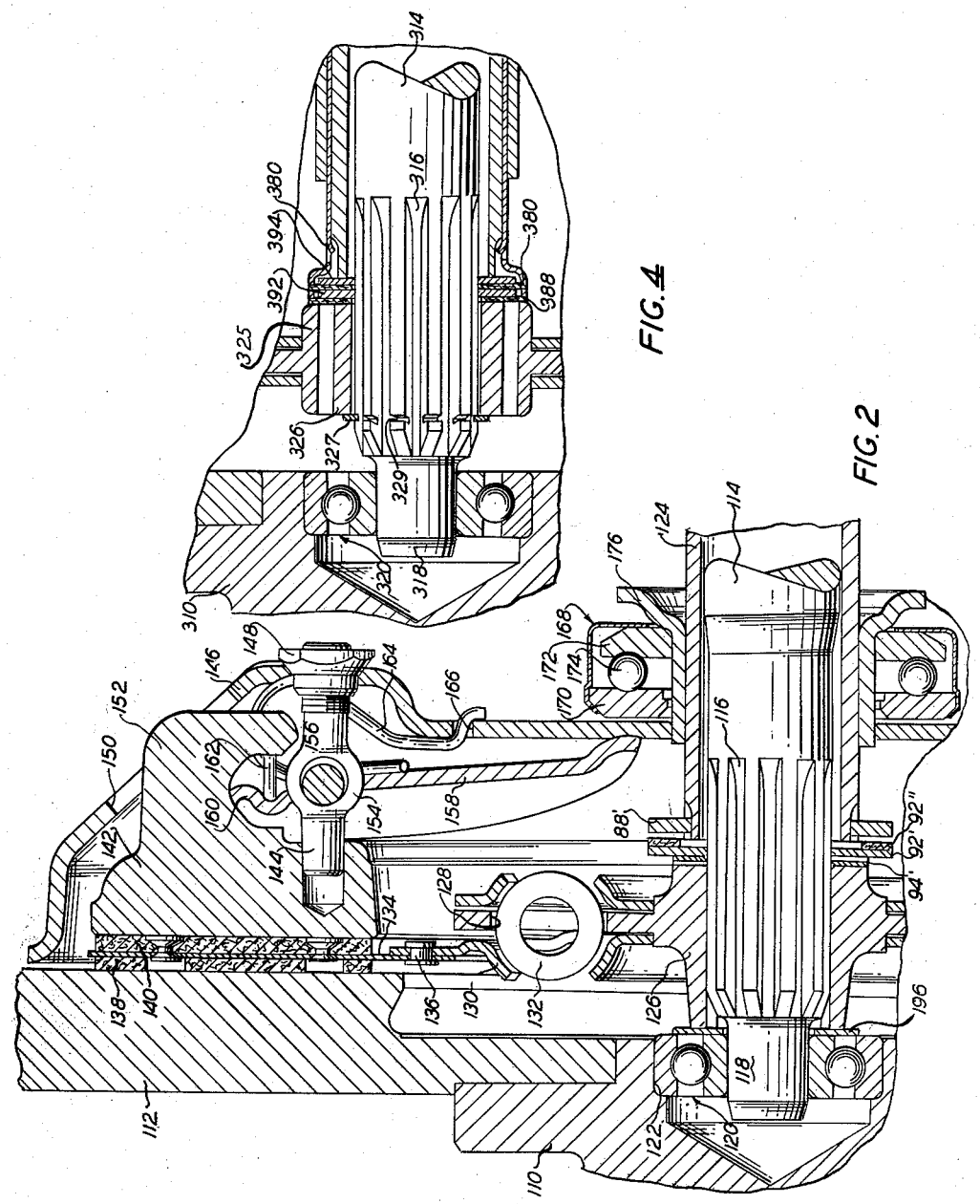

United States Patent Office 3,097,731
Patented July 16, 1963

3,097,731
POWER TRANSMITTING CLUTCH WITH ANTI-INERTIA BRAKING MEANS
John D. Wells, Detroit, Mich., assignor to Ford Motor Company, Dearborn, Mich., a corporation of Delaware
Filed Mar. 28, 1960, Ser. No. 18,070
5 Claims. (Cl. 192—13)

My invention relates generally to power transmission mechanisms and more particularly to multiple speed power transmission mechanisms having synchronized gears which may be manually controlled to establish gear ratio changes.

My invention is particularly adapted to be used with conventional manually controlled, multiple speed power transmission mechanisms of the type in current use in the automotive industry. Such transmissions normally include a power input shaft which may be connected and disconnected from a vehicle engine crankshaft by means of a driver operated friction clutch. The power input shaft is coaxially disposed with respect to the transmission main shaft, and the main shaft in turn forms a part of the power output shaft. A countershaft is disposed in the assembly in parallel relationship relative to the main shaft and it rotatably supports a cluster gear assembly having a plurality of gear portions formed thereon.

A second speed gear is rotatably journaled on the main shaft and it is disposed in continuous, meshing engagement with one gear portion of the cluster gear assembly. A power input gear is joined to the power input shaft and it is likewise disposed in continuous, meshing engagement with one portion of the cluster gear assembly.

Synchronizer clutch means are employed for selectively clutching the second speed gear to the main shaft or locking the main shaft to the power input shaft. This action causes the transmission to assume either an intermediate driving speed ratio or a high speed, direct drive ratio.

In addition to the foregoing, a forward and reverse sliding gear is slidably splined to the main shaft, and the sliding gear may be moved axially in one direction into driving engagement with a low speed gear portion of the cluster gear assembly to establish a low speed over-all speed ratio or it may be moved in the opposite direction into driving engagement with a reverse idler gear to effect reverse drive. The reverse idler pinion is in continuous meshing engagement with the reverse drive gear portion of the cluster gear assembly.

To condition the transmission for neutral operation, the synchronizer clutch is disengaged and the sliding gear is moved out of engagement with the cluster gear assembly and the reverse idler gear. The transmission may then be shifted into a reverse driving ratio condition by disengaging the main friction clutch and by manually shifting the low speed gear into engagement with the low speed gear portion of the cluster gear assembly.

When such a shift is initiated, the cluster gear assembly and the rotary portions of the friction clutch mechanism will continue to rotate for a short interval after the main friction clutch is disengaged by reason of the inertia of the rotating mass. With conventional transmission mechanisms it is therefore necessary for the vehicle operator to delay a manual shift from neutral into low or from neutral into reverse since the low gear portion of the cluster gear assembly and the reverse idler gear will continue to rotate with the cluster gear assembly for a time interval of several seconds after the disengagement of the main clutch. After the cluster gear assembly has slowed to the required degree, the vehicle operator may then shift the low and reverse gear into its appropriate torque delivering position.

To effect a transition from low speed operation to intermediate speed operation, the vehicle operator must move the sliding gear into the neutral position and the synchronizer clutch is actuated to lock the intermediate gear to the main shaft. During the time that the synchronizer clutch is being actuated, the main clutch is disengaged as previously explained. The synchronizer clutch acts in the usual fashion to reduce the degree of relative rotation between the main shaft and the intermediate speed gear prior to engagement of the clutch. When a shift into direct drive is initiated, the main friction clutch is again disengaged and the synchronizer clutch is actuated as previously explained to lock the main shaft to the input shaft. At this time a speed differential exists between the power input shaft and the main shaft and the synchronizer clutch functions to reduce the degree of relative rotation prior to engagement of the clutch.

According to a principal feature of my instant invention, I have provided a means for overcoming the inertia effect caused by rotation of the cluster gear assembly and the clutch plate of the transmission main clutch. In order to effect a smooth transition from one gear ratio to another, it is desirable to minimize the degree of relative rotation of the transmission components prior to engagement thereof. This condition is especially aggravated during a shift from neutral to low speed operation or from neutral to reverse since the nonrotating low and reverse sliding gear must in these instances be moved into driving engagement with the low gear portion of the cluster gear assembly or into driving engagement with the reverse idler gear, as appropriate. There is no synchronizer clutch to facilitate such a shift and to bring the relatively movable elements of the transmission mechanism into synchronism during the shift interval.

Although the above-described inertia effects are present during a shift from low speed operation to intermediate speed operation and from intermediate speed operation to direct drive operation, the above-described condition is not as aggravated as it is during a shift from neutral to low or from neutral to reverse. This is due in part to the fact that the aforedescribed synchronizer clutches operate to bring the intermediate speed gear and the main shaft into synchronism prior to clutching engagement of the same. The synchronizer clutches are also effective to bring the main shaft and the power input shaft into synchronism prior to completion of the shift from intermediate to direct drive.

The provision of an improved braking means of the type above described being a principal object of my invention, it is a further object of my invention to provide a braking mechanism capable of overcoming the inertia effect of the rotary portion of a conventional manually controlled power transmission mechanism and which may be automatically operated when the shift from one speed ratio to another is initiated thereby reducing the shift time interval and improving the shift quality by eliminating gear clashing caused by residual rotation of the cluster gear assembly and the reverse idler gear.

It is a further object of my invention to provide a brake means of the type above described which may be incorporated in transmission mechanisms of known construction with a minimum of alteration being required.

It is a further object of my invention to provide a brake means as above described which may be actuated by means of the operating mechanism for the transmission main friction clutch, and which may be energized when the aforementioned friction clutch is adjusted to a disengaged position.

In certain transmission installations, the main friction clutch comprises a rotary clutch disc situated between an engine powered flywheel and an operator controlled clutch pressure plate. Under certain circumstances, especially when the clutch mechanism is out of adjustment, a certain degree of drag on the clutch disc will be present when the engine is operating with the main friction clutch in a disengaged position. This drag aggravates the above-described inertia effect since such drag will cause increased relative rotation of the cluster gear assembly relative to the low and reverse sliding gear and between the reverse idler pinion and the lower and reverse sliding gear. It is therefore a further object of my invention to provide a brake means which will overcome the effect of the above-described clutch drag in addition to overcoming the inertia effect of the rotary portions of the transmission mechanism during a shift interval.

For the purpose of more particularly describing my invention, reference will be made to the accompanying drawings wherein:

FIGURE 1 is a partial cross sectional view of the main friction clutch mechanism for a multiple speed power transmission mechanism of the type above described;

FIGURE 2 is a cross sectional view similar to that of FIGURE 1 which shows a brake mechanism of an alternate construction;

FIGURE 3 is another modified form of a brake mechanism for use in a friction clutch structure of the type shown in FIGURES 1 and 2; and FIGURE 4 is a still further modification showing a brake means for use with a main friction clutch mechanism having a floating clutch disc.

Referring first to FIGURE 1, an engine crankshaft is represented by reference numeral 10 and a flywheel structure is shown at 12. A transmission power input shaft is shown at 14 and it includes a splined portion 16. The forward end of the splined portion 16 is formed with a reduced diameter as shown at 18 and this portion 18 is journaled within a pilot bearing 20. The bearing 20 in turn is received within a pilot bearing recess 22 formed in crankshaft 10. The shaft 14 is received within a transmission bearing retainer sleeve shaft 24 which is held in a relatively stationary position with respect to shaft 14.

The splined portion 16 of shaft 14 is received within an internally splined clutch hub 26 having a radially extending portion with openings 28. A clutch disc supporting member is identified by numeral 30 and it includes parts situated on either side of the radially extending portion of hub 26. Supporting member 30 is formed with tangentially extending openings which cooperate with openings 28, and within which damper springs 32 are received. The ends of springs 32 are seated on the ends of the openings formed in member 30 and on the ends of opening 28. The member 30, the radially extending portion of hub 26 and the springs 32 act in a known manner to dampen the torsional vibrations to which the clutch mechanism is subjected during operation.

A clutch disc is shown at 34 and it is carried by member 30, suitable rivets 36 being provided to form a connection between disc 34 and supporting member 30. A non-metallic friction material is secured to clutch disc 34 on either side thereof as indicated by reference numerals 38 and 40. Friction material 38 is adapted to frictionally engage the adjacent annular surface of flywheel 12 and friction material 40 is adapted to engage the adjacent friction surface on clutch pressure plate 42.

Pressure plate 42 is annular in form and it is supported by pins 44 at several locations, said pins 44 being received within axially extending openings. Pressure plate 42 may move upon the supporting pins 44 in an axial direction to compress the friction material of clutch plate 34 between the flywheel 12 and the friction surface of the clutch pressure plate.

The pins 44 are supported by a clutch housing 46 and they may be fixed thereto by anchoring nuts 48 threadably received on the pins 44 and disposed within cooperating openings formed in the clutch housing 46. The housing 46 may be formed with suitable apertures 50 for the purpose of accommodating lever portions 52 of the clutch pressure plate 42.

Each of the pins 44 is formed with an eyelet 54 through which a fulcrum pin 56 is received. Each pin 56 is carried by a clutch release lever 58 extending in a generally radial direction. The radially outward portion of the release lever 58 is recessed as shown at 60 to accommodate a thrust member 62 which acts against the lever portion 52 of the clutch pressure plate 42. A horseshoe spring 64 of relatively low rate is carried by the clutch housing 46 and is received through an opening 66 formed in housing 46 as indicated. The other end of spring 64 acts on clutch release lever 58 at a location radially inward from fulcrum pin 56. The clutch release lever 58 is thereby urged in a counterclockwise direction, and in this way compensation is made for the slack in the clutch lever mechanism.

A plurality of compression springs, not shown, is interposed between the clutch housing 46 and the pressure plate 42. These springs are effective to move pressure plate 42 into clutching engagement with clutch plate 34.

A clutch release bearing and housing assembly is generally identified in FIGURE 1 by reference numeral 68 and it comprises a pair of clutch bearing races 70 and 72 between which is situated a plurality of thrust ball members 74. A bearing hub in the form of a sleeve is shown at 76 and it is adapted to move as a unit with races 70 and 72. The hub sleeve 76 is slidably supported by a sleeve 78 which in turn is keyed, as shown at 80, to the stationary bearing retainer sleeve 24, the latter being bolted or otherwise secured to the transmission casing. The sleeve 78 is normally biased in the left-hand direction, as viewed in FIGURE 2, by a compression spring 82 which encircles bearing retainer 24 and which is disposed between a thrust ring 84 and a shoulder 86 formed on the retainer sleeve 24.

A pair of friction washers is shown in FIGURE 1 at 88 and 90 and each of these washers may be keyed at the outer peripheries thereof to an enlarged diameter end portion of the sleeve 78. The washers 88 and 90 are therefore anchored against rotary movement by reason of the positive connection between these washers and the sleeve 78 and by reason of the keyed connection between sleeve 78 and retainer sleeve 24. A pair of internally splined steel washers are shown at 92 and 94 and they are received over the splined portion 16 of shaft 14, the external splines on the latter engaging the internal splines on the former. The washers 92 and 94 thereby turn with shaft 14, and when the shaft 14 moves relative to retainer sleeve 24, relative movement also takes place between the steel washers 92 and 94 and the adjacent friction washers 88 and 90.

During the operation of the mechanism as shown in FIGURE 1, the vehicle operator will move the clutch release bearing assembly 68 in a left-hand direction by means of a conventional clutch pedal mechanism and the clutch release bearing assembly will be engaged with the radially inward end of clutch release lever 58. The lever 58 will then urge the pressure plate 42 out of engagement with the clutch plate 34 thereby interrupting the driving connection between the flywheel 12 and the shaft 14. The pressure plate 42 is normally held in engagement with the clutch plate 34, as previously explained, by compression springs, not shown. These same springs therefore tend to normally maintain the clutch release lever 58 in the clutch applied position shown in FIGURE 1. However, when the clutch release bearing is moved in a left-hand direction, as previously explained, the sleeve 78 will be urged by spring 82 in a left-hand direction, and this spring force is applied to the washers 88, 90, 92 and 94 thereby causing the same to become frictionally engaged. Any rotation of shaft 14 will tend to be retarded by reason of the braking action provided by the frictionally engaged washers 88, 90, 92 and 94. The clutch disc hub 26 accommodates the reaction for the spring 82 since the shaft 14 is braked in this fashion. Whenever the operator disengages the main transmission friction clutch, the spin time for the cluster gear assembly and the clutch disc 34 is substantially reduced and this facilitates a smooth shift from neutral to low or from neutral to reverse, as previously indicated.

Referring next to FIGURE 2, I have shown a modified form of the brake means for my instant invention. The clutch structure to which the brake means is applied may be the same as that which was previously discussed with reference to FIGURE 1 and the corresponding parts for the clutch members shown in FIGURE 2 have been identified by corresponding reference numerals in the one hundred series. It will be noted, however, that the brake means for retarding the motion of power input shaft 114 comprises a steel washer 88' which may be keyed or splined to the transmission bearing retainer 124. The splined or keyed connection between steel washer 88' and retainer 124 will accommodate relative axial movement therebetween.

Another steel washer is shown at 92' and it is internally splined to accommodate sliding engagement with splined portion 116 of the transmission power input shaft 114. Steel washer 92' is formed with a friction surface, identified by reference character 92", which is situated on the rear face of washer 92' in the region of the outer periphery of the latter. A spring washer 94' is situated between the clutch disc hub 126 and washer 92' as indicated, said spring washer permitting a limited degree of axial movement of washer 92' with respect to shaft 114.

The steel washer 88' is adapted to be engaged by the hub sleeve 176 of the clutch release bearing assembly 168. When the vehicle operator moves the clutch release bearing in a left-hand direction during disengagement of the transmission main friction clutch after the clutch release bearing assembly 168 has been moved sufficiently to cause the main transmission clutch to disengage, the hub sleeve 176 will engage steel washer 88' thereby urging the latter into frictional engagement with the washer 92'. This causes a braking action to take place upon shaft 114 and any relative motion of shaft 114 following disengagement of the main transmission clutch will be retarded by reason of the braking action of the washers 88' and 92'. The spring washer 94' may be of undulated form and any variation in travel is accommodated by the free play which is made available by reason of the deflection of the same.

In each of the above-described embodiments of FIGURES 1 and 2, the thrust forces acting on the clutch disc hubs 126 or 26 are transferred to a pilot bearing through a suitable thrust washer, the washer in the embodiment of FIGURE 1 being shown at 96 and the thrust washer in the embodiment of FIGURE 2 being shown at 196.

Referring next to the embodiment shown in FIGURE 3, I have provided an alternate means for accommodating the thrust reaction acting on a clutch disc hub. In other respects the embodiment in FIGURE 3 is similar to that of FIGURE 1 and, accordingly, the reference characters in the two hundred series for the various components of the embodiment of FIGURE 3 correspond to the reference characters used in describing the embodiment of FIGURE 1. The forward end of the clutch disc hub 226 defines an annular shoulder which acts against a snap ring 227 which may be suitably positioned in a snap ring groove 229 formed in the periphery of the splined portion 16 of shaft 14. The need for providing a thrust washer adjacent the pilot bearing is thereby eliminated.

Referring next to the embodiment of FIGURE 4, the brake means therein shown is the same as that which was previously described in reference to FIGURE 1. Accordingly, the various components of the embodiment of FIGURE 4 have been identified by reference characters in the three hundred series corresponding to those reference characters used in describing the embodiment of FIGURE 1. It is to be noted, however, that the clutch disc hub has been modified so that it includes a first internally splined portion 326 which is adapted to be received in mating engagement with splined portion 316 of shaft 314. Hub portion 326 is maintained in a fixed axial position on splined portion 316 by snap ring 327 which is received in a snap ring groove 329 formed on the outer periphery of the spline teeth for the splined portion 316.

The outer periphery of hub portion 326 is externally splined to facilitate a sliding splined connection with an internally splined hub portion 325. Hub portion 325 in turn is drivably connected to the clutch disc through a vibration damper of the type previously described in reference to FIGURE 1. The clutch disc of the embodiment of FIGURE 4 is capable of a semi-floating movement by reason of the axial motion which is made available between hub portions 325 and 326. However, the braking action of the washers 388, 390, 392 and 394 is identical to that which was previously described with reference to FIGURE 1.

It is emphasized that the embodiment of FIGURE 4 is less adaptable for use in a transmission installation in which the center line of the transmission main shaft forms a relatively large angle with respect to the horizontal. In such as installation the clutch disc will tend to drag on the clutch pressure plate and it would therefore be more practical to employ instead a clutch construction of the type described with reference to FIGURES 1, 2 or 3.

Having thus described certain preferred embodiments of my instant invention, what I claim and desire to secure by United States Letters Patent is:

1. In a power transmission mechanism adapted to transfer power from a power source to a driven member and including a power input shaft, a stationary sleeve shaft disposed about said power input shaft, a friction clutch mechanism adapted to form a releasable driving connection between said power input shaft and said power source, said clutch mechanism comprising a hub connected to the power input shaft, a clutch disc carried by said hub, personally operable means for applying and releasing said clutch mechanism, a first brake element connected to said power input shaft, a second brake element connected to said sleeve shaft, said brake elements being disposed adjacent said hub and between said hub and one end of said sleeve shaft, one portion of said personally operable means being engageable with one of said brake elements and adapted to urge the same into frictional engagement with the other brake element when said clutch mechanism is released, said hub accommodating the thrust forces applied to said brake elements.

2. In a power transmission mechanism for transferring power from a power source to a driven member, a power input shaft, a stationary sleeve, said power input shaft being disposed within said sleeve, a clutch mechanism adapted to form a releasable driving connection between said power source and said power input shaft, personally operable clutch means including a clutch release member disposed about and supported by said sleeve, a first friction element connected to said sleeve, a second friction element connected to said power input shaft, and yieldable means for normally urging said friction elements into frictional braking engagement, said clutch release member engaging said yieldable means and urging the same to an inoperative position when said personally operable clutch means assumes a clutch engaging position.

3. In a power transmission mechanism for transferring power from a power source to a driven member, a power input shaft, a stationary sleeve, said power input shaft being disposed within said sleeve, a clutch mechanism adapted to form a releasable driving connection between said power source and said power input shaft, said clutch mechanism including a clutch hub connected to said power input shaft, personally operable clutch means including a clutch release member mounted about and supported by said sleeve, a first brake element connected to said sleeve, and a second brake element connected to said power input shaft adjacent said hub, said clutch release member being adapted to transmit a braking force to said brake elements whereby said brake elements are urged into frictional braking engagement when said personally operable clutch means assumes a clutch disengaging position, the force reaction accompanying said braking force being accommodated by said hub.

4. In a power transmission mechanism adapted to transfer power from a power source to a driven member, a power input shaft, a stationary sleeve, said power input shaft being disposed within said sleeve, a friction clutch mechanism adapted to form a releasable driving connection between said power input shaft and said power source, personally operable means for applying and releasing said clutch mechanism, a first brake element carried by said power input shaft, a second brake element connected to said sleeve, said clutch mechanism including a rotary clutch disc, a clutch disc hub connected to and supporting said clutch disc, said clutch disc hub being positively connected to said power input shaft, said brake elements being disposed adjacent said clutch disc hub in juxtaposed relationship, said personally operable means including a clutch release member mounted about and supported by said sleeve, and yieldable brake operating means for urging said brake elements into frictional engagement, said clutch release member engaging said yieldable means and urging the same to an inoperative position when said personally operable means assumes a clutch engaging position, said clutch disc hub being adapted to accommodate the thrust reaction of said yieldable means on said brake elements.

5. In a power transmission mechanism adapted to transfer power from a power source to a driven member and including a power input shaft, a friction clutch mechanism adapted to form a releasable driving connection between said power input shaft and said power source, personally operable means for applying and releasing said clutch mechanism, brake means for braking said power input shaft including a first friction brake element secured to a relatively stationary portion of said mechanism and a second friction brake element connected to said input shaft, said personally operable means having elements common to said brake means whereby the operation of the latter is responsive to movement of the former and comprising a first hub portion drivably connected to said power input shaft and a second hub portion disposed about said first hub portion, and a positive driving connection between said hub portions, said driving connection accommodating relative movement between said hub portions in the direction of the axis of said power input shaft.

References Cited in the file of this patent
UNITED STATES PATENTS

| | | |
|---|---|---|
| 1,498,353 | Coatalen et al. | June 17, 1924 |
| 1,787,160 | Moorhouse | Dec. 30, 1930 |
| 1,861,253 | Wemp | May 31, 1932 |
| 1,974,390 | Eason | Sept. 18, 1934 |
| 2,555,860 | Reed | June 5, 1951 |
| 2,590,089 | Cook | Mar. 25, 1952 |
| 2,592,751 | Serednicky et al. | Apr. 15, 1952 |
| 2,861,482 | Schjolin | Nov. 25, 1958 |
| 2,863,537 | Root | Dec. 9, 1958 |